Patented Dec. 2, 1924.

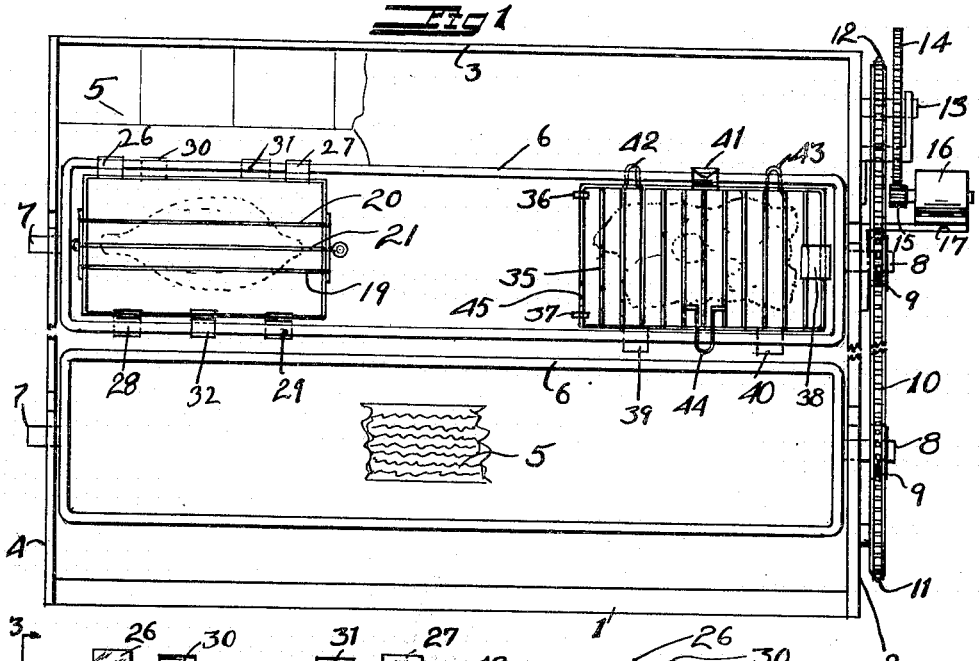

1,517,795

UNITED STATES PATENT OFFICE.

ALBERT C. MORRISSON AND FRANK SEYFERTH, OF SAN FRANCISCO, CALIFORNIA.

BROILER.

Application filed March 25, 1924. Serial No. 701,696.

*To all whom it may concern:*

Be it known that we, ALBERT C. MORRISSON and FRANK SEYFERTH, citizens of the United States, residing at San Francisco, in the county of San Francisco, State of California, have invented a new and useful Broiler, of which the following is a specification in such full and clear terms as will enable those skilled in the art to construct and use the same.

This invention relates to a broiler especially intended for use in restaurants and hotels where a considerable quantity of meat is to be cooked, and an object of the invention is to provide a broiler which can be easily attached to and detached from the broiling apparatus while it is operating thereby making the work more speedy than if the broiler has to be stopped each time one of the meat holders is applied thereto, or if the ordinary type of meat holding device is used.

Another object of the invention is to provide a meat holding device which will hold the meat perfectly flat and thereby insure more even cooking than if the meat is allowed to curl up.

Another object of the invention is to provide means whereby the meat may be easily applied to and removed from the meat holder itself whenever the meat is placed therein or when it is to be removed therefrom.

Other objects of the invention will appear as the description proceeds.

An embodiment of the invention is shown in the accompanying drawings in which the same reference numeral is applied to the same portion throughout, but we are aware that there may be modifications thereof.

Fig. 1 is a front elevation of the operating apparatus, showing two of the meat holding frames applied to one of the rotary frames, another rotary frame being shown without the meat holding frame in place therein, Fig. 2 is a side elevation of one of the broilers, Fig. 3 is an end view of the broiler shown in Fig. 2, Fig. 4 is an edge view of the broiler shown in Fig. 2, Fig. 5 is an edge view of one of the broilers shown in Fig. 1, showing it unlatched ready for the application thereto of a steak or other portion of meat.

The numerals 1 to 4 inclusive represent a rectangular frame, which in actual practice extends vertically in front of a charcoal or electric or other grill 5.

The rectangular frame forms the support for a plurality of other narrower rectangular frames 6 each of which has a trunnion, as indicated at 7 and 8. Each trunnion 8 is provided with a sprocket wheel 9. There are usually several of the frames 6 and they are all driven by means of a sprocket chain 10 which passes around the sprocket wheel 11 at the bottom of the bar 2 and over the sprocket wheel 12 on a shaft 13 at the top of the bar 2. The sprocket chain 10 is driven by means of the gear 14 and pinion 15 connected with a suitably slow speed motor 16, said motor being secured on a frame 17 carried by the bar 2.

The rectangular frames 6 of which there may be a considerable number, each form a support for several of the meat holding frames or broilers 18. These broilers each consist of a rectangular metal frame having a pair of bars 19 and 20 extending from end to end thereof, and a bar 21 which is carried by a pair of lugs 22, 23, one of said lugs having a slot with a hook as indicated at 24 to secure the bar 21 in place.

In order to secure the broiler in place in the frame 6, it is provided with the rectangular frame which is provided with four spring snaps 26 to 29 inclusive, and it also has three spring stops 30 to 32 inclusive. The operation of the apparatus is as follows:

Assuming a portion of meat, as a chicken or other body of meat, as small enough in size to be secured to the broiler by securing it against the two wires 19 and 20 and to be held against the same by having wire 21 passed into the slot 24, the cook quickly snaps the broiler frame into one of the frames 6, while the same is rotating. Similarly when the meat is cooked the frame of the broiler is simply snapped out of the frame 6.

The broiler shown in Figs. 2 and 3 and 4 is especially intended for rather large and uneven bodies of meat, however, if a steak is to be cooked, a frame with a plurality of cross-bars 35 is used. This frame has hinged links 36, 37 at one end, a latch 38 at the other end, and it has three spring snaps 39 to 41. It is also provided with three stops 42 to 44 inclusive and the side of the frame opposite from the bars 35 is made up of a plurality of bars 45. This frame is used in precisely the same manner as the other frame.

What we claim is as follows, but modifications may be made in carrying out the invention shown in the drawings and in the above particularly described form thereof within the purview of the invention as defined by the annexed claims:

1. A meat broiler comprising a fixed frame, an elongated revoluble frame supported by the fixed frame, means to rotate the elongated frame, detachable meat broiling frames, snaps on opposite edges of the meat broiler to secure said broiler to the revoluble frame, and spring stops on the broilers to prevent them from being pushed through the revoluble frame.

2. A meat broiler comprising a fixed frame, an elongated revoluble frame in the fixed frame, means to rotate the elongated frame, a meat holding broiler, spring snaps on its edges to secure it in the revoluble frame, and spring stops on the edge of the broiler to prevent it from being pushed through the revoluble frame when placed in position without stopping the machine.

3. A meat broiler comprising a rectangular frame, means in two planes carried by said frame to hold a body of meat, means to detachably hold one of said members and the body of meat against the other member, spring snaps on opposite edges of the frame to hold the frame in a revoluble broiler frame and oppositely arranged stops on the meat holding frame to prevent the same from being pushed too far through the revoluble broiler frame.

In testimony whereof we have hereunto set our hands this 19th day of March, A. D. 1924.

ALBERT C. MORRISSON
FRANK SEYFERTH.